(12) United States Patent
Wang

(10) Patent No.: US 11,843,409 B2
(45) Date of Patent: Dec. 12, 2023

(54) RECEIVER AND ASSOCIATED SIGNAL PROCESSING METHOD

(71) Applicant: Realtek Semiconductor Corp., HsinChu (TW)

(72) Inventor: Lihua Wang, Suzhou (CN)

(73) Assignee: Realtek Semiconductor Corp., HsinChu (TW)

( * ) Notice: Subject to any disclaimer, the term of this patent is extended or adjusted under 35 U.S.C. 154(b) by 0 days.

(21) Appl. No.: 17/892,168

(22) Filed: Aug. 22, 2022

(65) Prior Publication Data

US 2023/0072153 A1 Mar. 9, 2023

(30) Foreign Application Priority Data

Sep. 7, 2021 (CN) .......................... 202111042574.1

(51) Int. Cl.
*H04B 1/12* (2006.01)
*H04L 7/00* (2006.01)
*H04B 1/10* (2006.01)

(52) U.S. Cl.
CPC ........... *H04B 1/123* (2013.01); *H04B 1/1027* (2013.01); *H04L 7/0079* (2013.01)

(58) Field of Classification Search
CPC .... H04B 1/1027; H04B 1/123; H04B 1/1036; H04B 2001/1045; H04B 2001/1072; H04B 1/126; H04L 7/0079
See application file for complete search history.

(56) References Cited

U.S. PATENT DOCUMENTS

| 2005/0164665 A1* | 7/2005 | Suganuma | ............. H04B 1/109 455/278.1 |
| 2009/0221249 A1* | 9/2009 | Aue | .................... H04L 27/2657 455/192.1 |
| 2019/0035414 A1* | 1/2019 | Christoph | ........... G10L 21/0224 |

FOREIGN PATENT DOCUMENTS

| CN | 104639194 A | 5/2015 |
| CN | 111542066 A | 8/2020 |

* cited by examiner

*Primary Examiner* — Khanh C Tran
(74) *Attorney, Agent, or Firm* — Winston Hsu

(57) ABSTRACT

The present invention provides a receiver including a filter, a signal detection circuit and a synchronization processing circuit. The filter is configured to filter a filter input signal to generate a filter output signal. The signal detection circuit is configured to determine whether the filter input signal or the filter output signal includes an interference signal according to the filter input signal and the filter output signal, to generate an interference signal indicator; wherein when the interference signal indicator indicates that the filter input signal or the filter output signal includes the interference signal, the signal detection circuit further determines whether the filter output signal comprises an effective signal to generate an effective signal indicator. The synchronization processing circuit is configured to process the filter output signal according to the interference signal indicator and the effective signal indicator.

17 Claims, 8 Drawing Sheets

RECEIVER AND ASSOCIATED SIGNAL PROCESSING METHOD

BACKGROUND OF THE INVENTION

1. Field of the Invention

The present invention relates to a receiver and associated signal processing method.

2. Description of the Prior Art

In a general wireless receiver, if intensity of interference signals of the adjacent channel in the environment is very large, it will have a bad influence on the reception of the effective signal, and the back-end synchronization processing circuit may not be able to accurately distinguish the interference signal from the effective signal, thereby causing errors or delays in signal processing. In order to solve the signal interference problem of adjacent channels, filters are generally set in a radio frequency (RF) circuit and a baseband circuit of the wireless receiver, and the filter is designed with higher order to filter out the interference signals as much as possible. However, when the frequency of the interference signal is very close to the effective signal, the filter cannot completely remove the interference signal, so that the subsequent circuit cannot immediately determine the interference signal and the effective signal.

SUMMARY OF THE INVENTION

It is therefore an objective of the present invention to provide a method for detecting an effective signal, which can accurately detect a time when an effective signal appears in the presence of an interfering signal, so as to solve the problem in the prior art.

According to one embodiment of the present invention, a receiver comprising a filter, a signal detection circuit and a synchronization processing circuit is disclosed. The filter is configured to filter a filter input signal to generate a filter output signal. The signal detection circuit is configured to determine whether the filter input signal or the filter output signal comprises an interference signal according to the filter input signal and the filter output signal, to generate an interference signal indicator; wherein when the interference signal indicator indicates that the filter input signal or the filter output signal comprises the interference signal, the signal detection circuit further determines whether the filter output signal comprises an effective signal to generate an effective signal indicator. The synchronization processing circuit is configured to process the filter output signal according to the interference signal indicator and the effective signal indicator.

According to one embodiment of the present invention, a signal processing method comprises the steps of: filtering a filter input signal to generate a filter output signal; determining whether the filter input signal or the filter output signal comprises an interference signal according to the filter input signal and the filter output signal, to generate an interference signal indicator; when the interference signal indicator indicates that the filter input signal or the filter output signal comprises the interference signal, determining whether the filter output signal comprises an effective signal to generate an effective signal indicator; and processing the filter output signal according to the interference signal indicator and the effective signal indicator.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
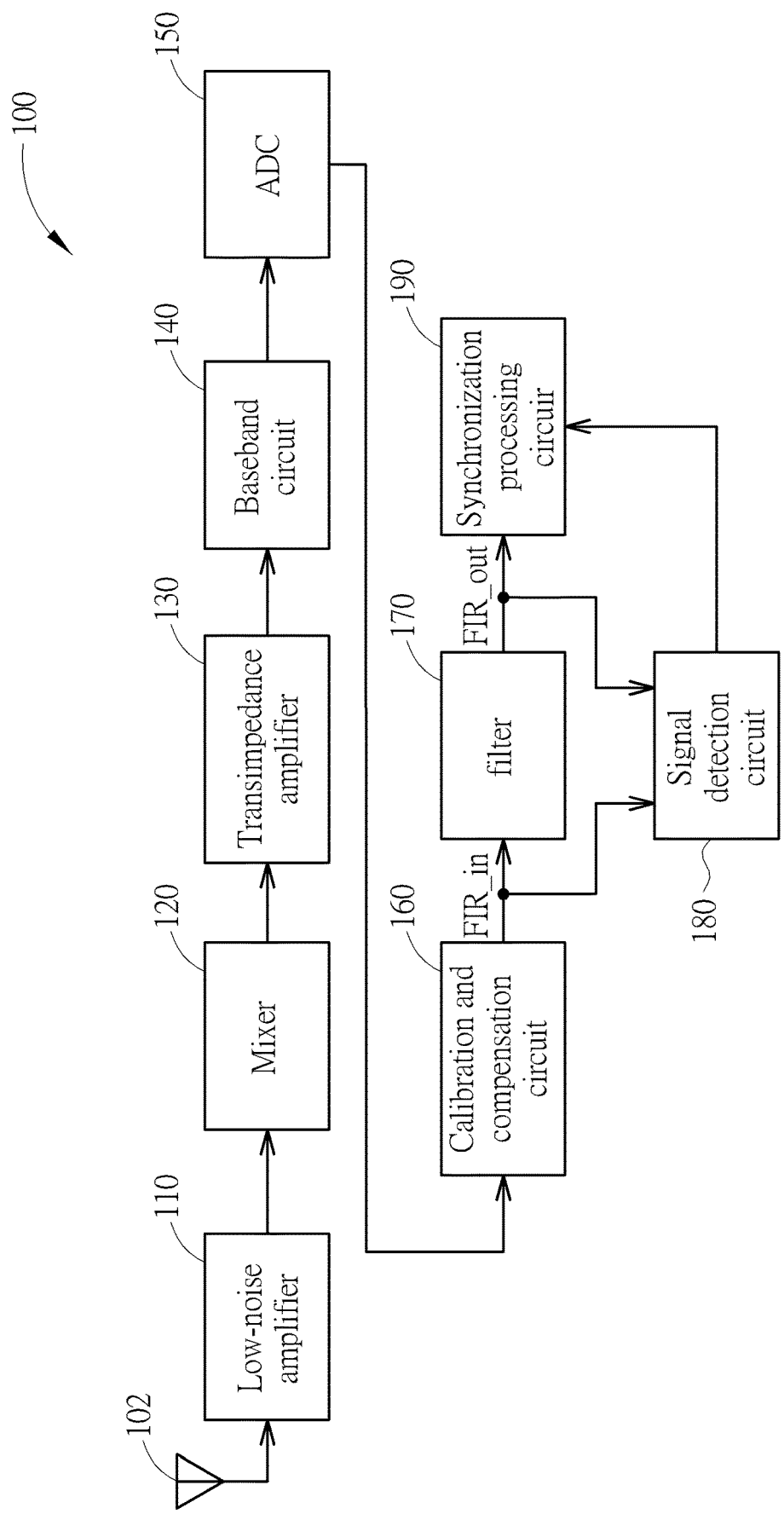
FIG. 1 is a diagram illustrating a receiver according to one embodiment of the present invention.

FIG. 1 is a diagram illustrating a receiver 100 according to one embodiment of the present invention. As shown in FIG. 1, the receiver 100 comprises a low-noise amplifier 110, a mixer 120, a transimpedance amplifier 130, a baseband circuit 140, an analog-to-digital converter (ADC) 150, a calibration and compensation circuit 160, a filter 170, a signal detection circuit 180 and a synchronization processing circuit 190. In this embodiment, the filter is a finite impulse response (FIR) filter, the receiver 100 receives and processes RF signals via an antenna, and the receiver 100 can be applied to any receiver for receiving RF signals, such as a receiver supporting Wi-Fi, Bluetooth or ZigBee specification.

In a basic operation of the receiver 100, the low-noise amplifier 110 receives the RF signal from the antenna 102 to generate an amplified signal, the mixer 120 performs a mixing operation on the amplified signal to lower a frequency of the amplified signal to generate a baseband signal, and the baseband signal is processed by the transimpedance amplifier 130, the baseband circuit 140 and the ADC 150 to generate a digital signal. Then, the calibration and compensation circuit 160 performs in-phase signal and quadrature signal calibration (IQ calibration) and DC signal compensation operation on the digital signal to generate a filter input signal FIR_in to the filter 170, the filter 170 filters the filter input signal FIR_in to generate a filter output signal FIR_out, and the synchronization processing circuit 190 then processes the filter output signal FIR_out.

Figure 2:
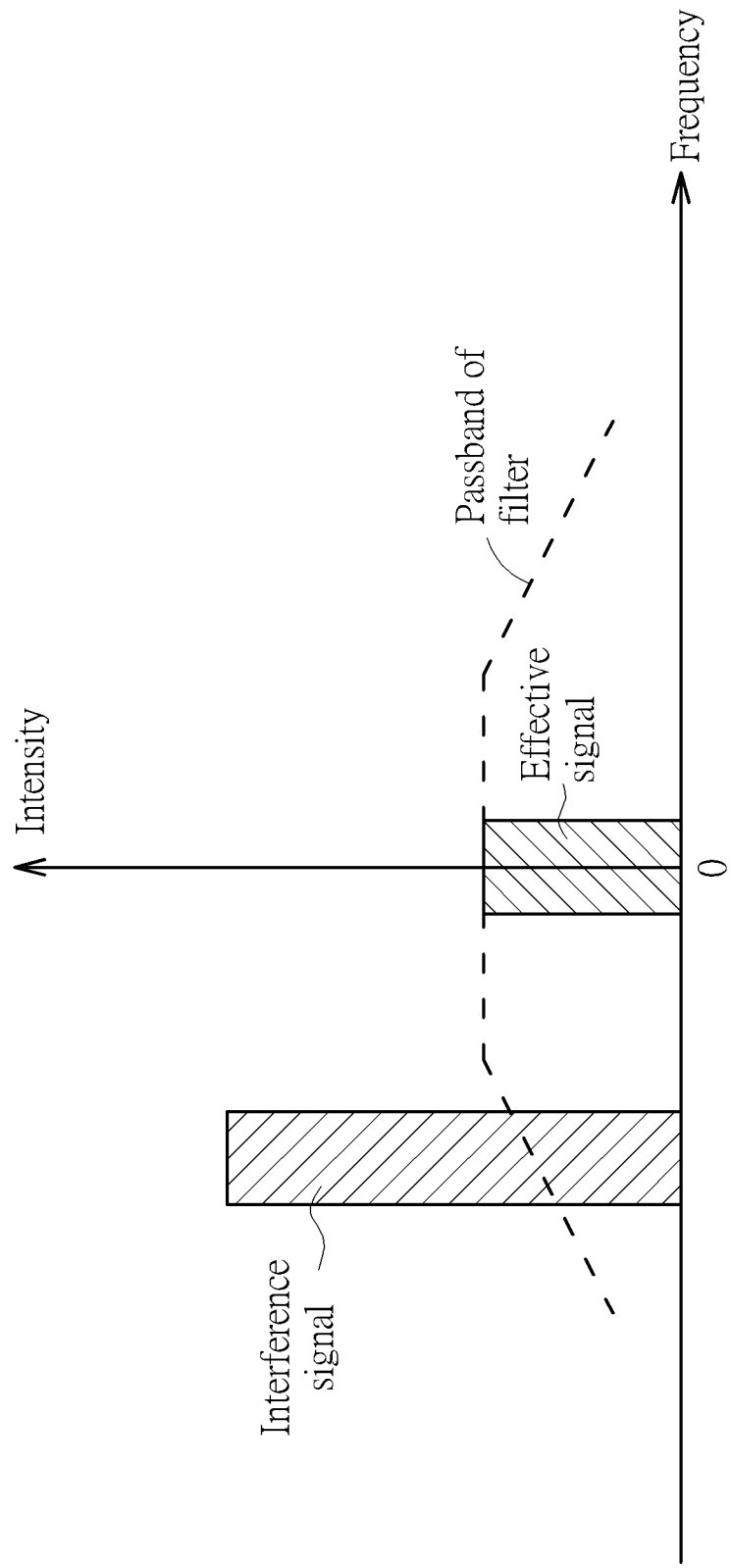
FIG. 2 is a diagram showing that a filter output signal still comprises a higher-strength interference signal.

As described in the prior art, if there is a high-strength interference signal of an adjacent channel in the environment, since the frequency of the interference signal is very close to a frequency of the effective signal, the filter 170 cannot completely remove the interference signal, so that the synchronization processing circuit 190 cannot immediately determine the interference signal and the effective signal, and may not be able to correctly determine when the effective signal appears. As shown in FIG. 2, the frequency of the interference signal is very close to the frequency of the effective signal, so the interference signal will be located within a passband of the filter 170, resulting in the filter output signal FIR_out still including the interference signal with higher intensity. In order to solve this problem, the present embodiment provides the signal detection circuit 180, which can accurately determine the interference signal and the effective signal according to the filter input signal FIR_in and the filter output signal FIR_out, especially for a case that the interference signal is in the filter input signal FIR_in, the signal detection circuit 180 can accurately determine the time when the effective signal appears, so that the synchronization processing circuit 190 can correctly read the effective signal and perform synchronization processing. It should be noted that since the key point of the present invention is how the signal detection circuit 180 uses the filter input signal FIR_in and the filter output signal FIR_out of the filter 170 to accurately determine the interference signal and the effective signal, the operations of the low-noise amplifier 110, the mixer 120, the transimpedance amplifier 130, the baseband circuit 140, the ADC 150 and the calibration and compensation circuit 160 shown in FIG. 1 are well known to a person skilled in the art, so the following description is only for the filter 170, the signal detection circuit 180 and the synchronization processing circuit 190.

Figure 3:
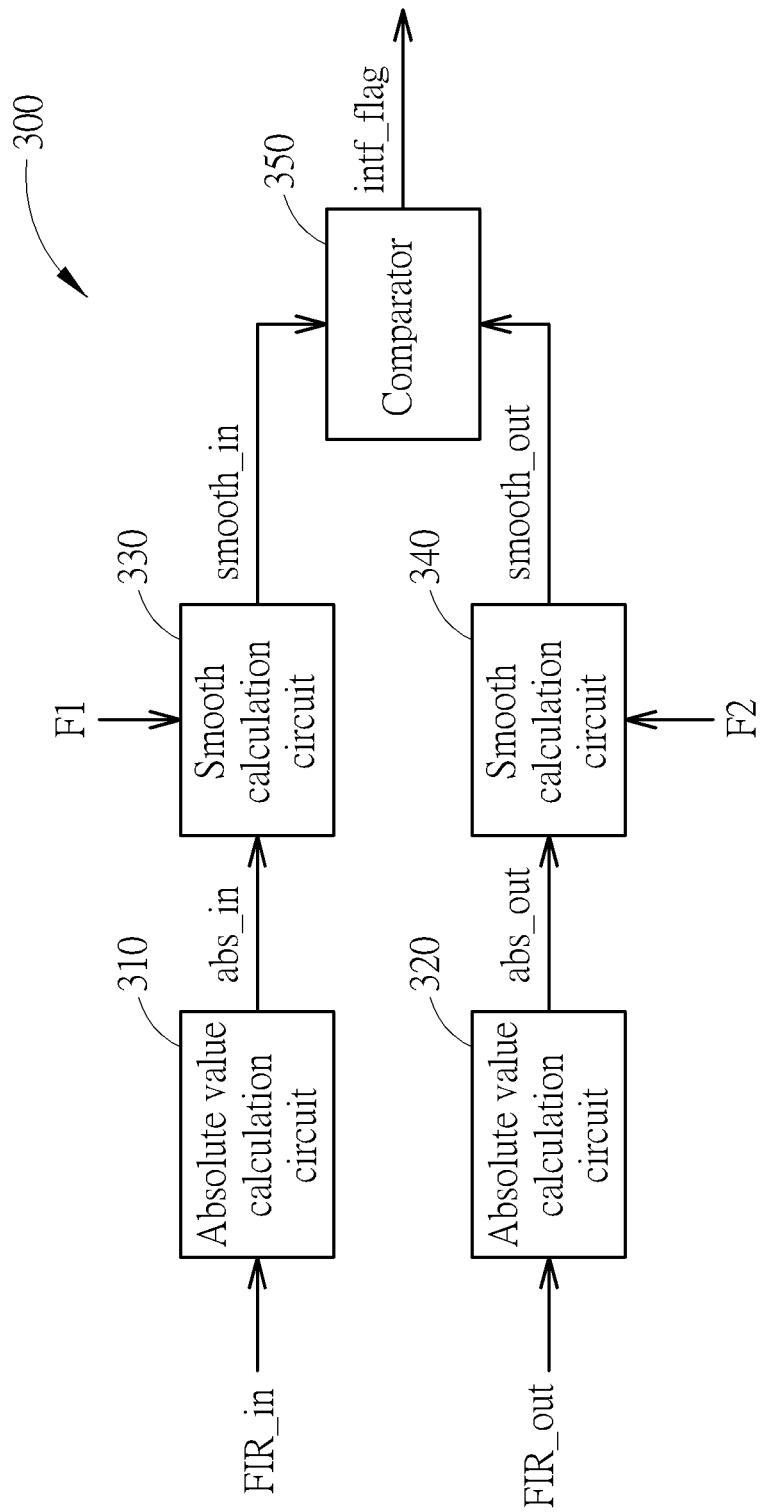
FIG. 3 is a diagram of an interference signal detection circuit included in a signal detection circuit according to one embodiment of the present invention.

FIG. 3 is a diagram of an interference signal detection circuit 300 included in the signal detection circuit 180 according to one embodiment of the present invention. As shown in FIG. 3, the interference signal detection circuit 300 comprises two absolute value calculation circuits 310 and 320, two smooth calculation circuits 330 and 340, and a comparator 350. In the operation of the interference signal detection circuit 300, the absolute value calculation circuit 310 receives the filter input signal FIR_in, and takes an absolute value of the filter input signal FIR_in to generate a first absolute value abs in. At the same time, the absolute value calculation circuit 320 receives the filter output signal FIR_out, and takes an absolute value of the filter output signal FIR_out to generate a second absolute value abs out. Then, the smooth calculation circuit 330 updates a first smooth calculation result smooth in according to the first absolute value abs in and a smoothing parameter F1 that is, the first smooth calculation result smooth in may be generated based on multiple first absolute values abs in of previous times. For example, the first smooth calculation result smooth in can be updated by using the following formula:

$$\text{smooth in} = \text{smooth in} * (1 - F1) + \text{abs in} * F1 \quad (1);$$

wherein the smoothing parameter F1 can be any suitable value such as (15/16) or (7/8). Similarly, the smooth calculation circuit 340 updates a second smooth calculation result smooth out according to the second absolute value abs out and a smoothing parameter F2. For example, the second smooth calculation result smooth out can be updated by using the following formula:

$$\text{smooth out} = \text{smooth out} * (1 - F2) + \text{abs in} * F2 \quad (2);$$

wherein the smoothing parameter F2 can be any suitable value, such as the same value as F1 Finally, the comparator 350 determines whether the filter input signal FIR_in comprises an interference signal according to the first smooth calculation result smooth in and the second smooth calculation result smooth out. In one embodiment, the comparator 350 can determine whether the filter input signal FIR_in comprises an interference signal according to whether there is a large difference between the first smooth calculation result smooth in and the second smooth calculation result smooth out. For example, if the first smooth calculation result smooth in is greater than the second smooth calculation result smooth out, and the difference is higher than a threshold value, it is determined that the filter input signal FIR_in comprises the interference signal, and the comparator 350 sets an interference signal indicator intf_flag to "1". If the first smooth calculation result smooth in is greater than the second smooth calculation result smooth out, and the difference is lower than the threshold value, it is determined that the filter input signal FIR_in does not comprise the interference signal, and the comparator 350 sets the interference signal indicator intf_flag to "0".

Figure 4:
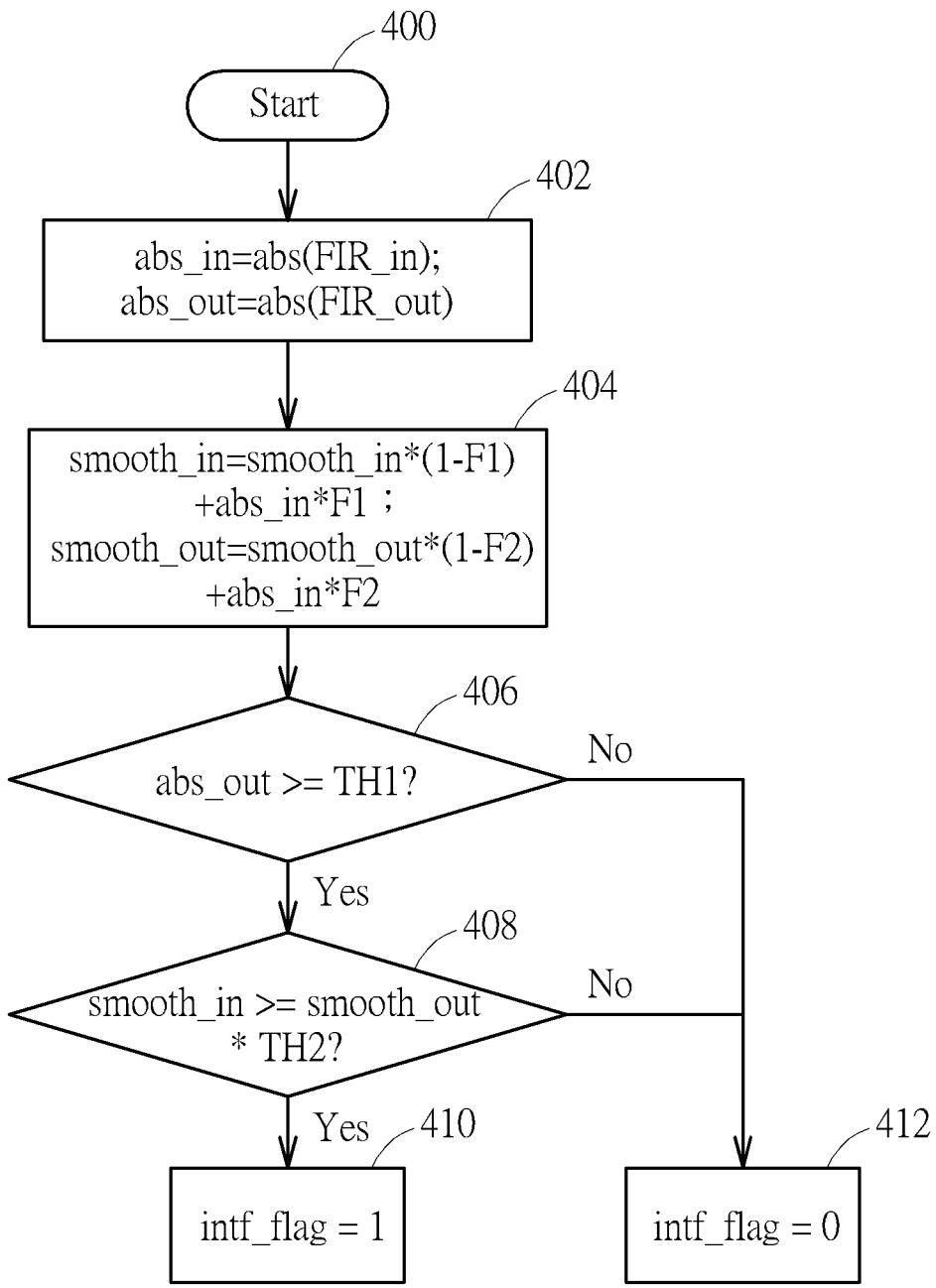
FIG. 4 is a diagram of determining whether a filter input signal comprises an interference signal according to one embodiment of the present invention.

FIG. 4 is a diagram of determining whether the filter input signal FIR_in comprises the interference signal according to one embodiment of the present invention. Referring to FIG. 3 and FIG. 4 together, the flow of FIG. 4 is described as follows.

Step 400: the flow starts.

Step 402: take an absolute value of the filter input signal FIR_in to generate the first absolute value abs in, and take an absolute value of the filter output signal FIR_out to generate the second absolute value abs out, that is, abs in=abs(FIR_in), and abs out=abs(FIR_out).

Step 404: the first smooth calculation result smooth in is updated according to the first absolute value abs in and the smoothing parameter F1, and the second smooth calculation result smooth out is updated according to the second absolute value abs out and the smoothing parameter F2, which can use the above formulas (1) and (2) to do the calculation.

Step 406: determine if the second absolute value abs out is greater than a threshold TH1, if yes, the flow enters Step 408; and if not, the flow enters Step 412. Since this embodiment mainly determines that the filter input signal FIR_in comprises the interference signal of the adjacent channel, Step 406 is used to avoid misjudging the white noise as the interference signal of the adjacent channel.

Step 408: determine whether the first smooth calculation result smooth in is greater than a product of the second smooth calculation result smooth out and a threshold value TH2, where the threshold value TH2 can be any suitable value, such as 3, 10, 30, 100, etc. If yes, the flow enters Step 410; and if not, the flow enters Step 412.

Step 410: set the interference signal indicator intf_flag to "1" to indicate that the filter input signal FIR_in comprises interference signal(s) (interference signal(s) of adjacent channel(s)).

Step 412: set the interference signal indicator intf_flag to "0" to indicate that the filter input signal FIR_in does not comprise the interference signal.

Figure 5:
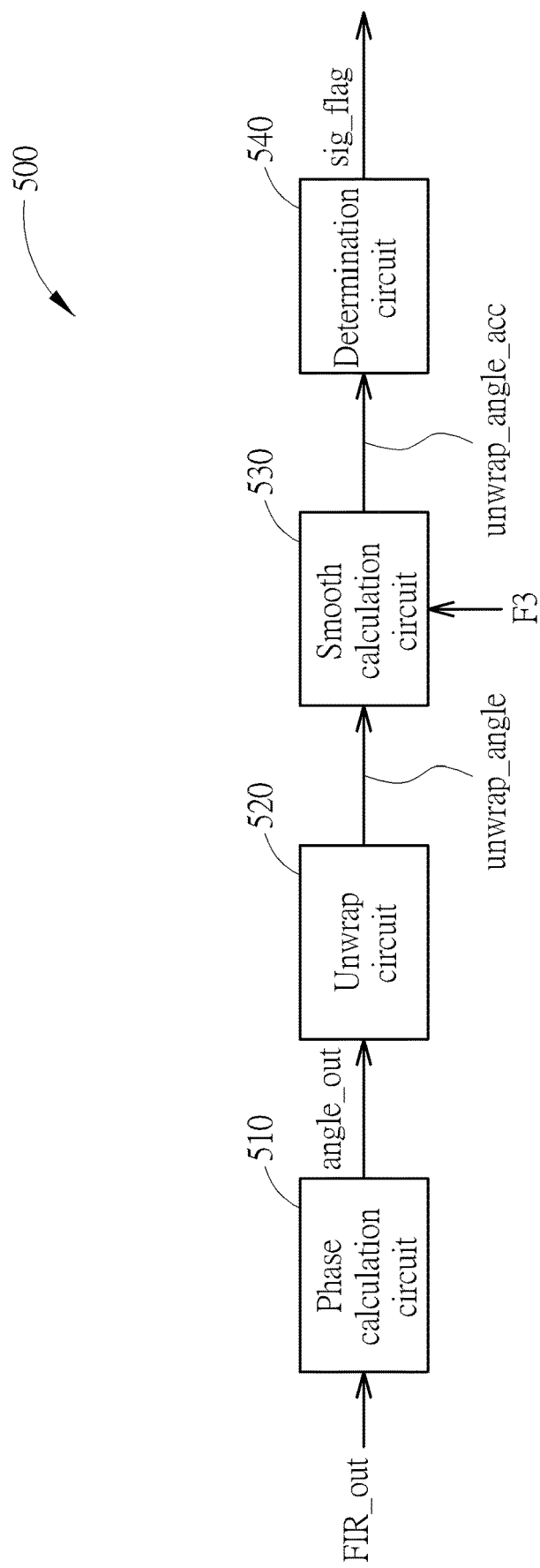
FIG. 5 is a diagram of an effective signal detection circuit included in the signal detection circuit according to one embodiment of the present invention.

The signal detection circuit 180 further comprises an effective signal detection circuit 500 as shown in FIG. 5, wherein the effective signal detection circuit 500 comprises a phase calculation circuit 510, an unwrap circuit 520, a smooth calculation circuit 530 and a determination circuit 540. In the operation of the effective signal detection circuit 500, the phase calculation circuit 510 receives the filter output signal FIR_out, and outputs a phase value angle_out of the filter output signal FIR_out. The unwrap circuit 520 unwraps the phase value angle_out output by the phase calculation circuit 510 to generate an unwrap result unwrap_angle. It should be noted that, since the operations of the phase calculation circuit 510 and the unwrap circuit 520 can be implemented by digital circuits using Cordic algorithm and the unwrap algorithm of the commercial mathematical software "Matlab", and details of the above two algorithms are not the focus of the present invention, so the details are not described in this specification. Then, the smooth calculation circuit 530 updates an unwrap smooth calculation result unwrap_angle_acc according to the unwrap result unwrap_angle and a smoothing parameter F3, that is, the unwrap smooth calculation result unwrap_angle_acc may be generated based on multiple unwrap results of previous times. For example, the unwrap smooth calculation result unwrap_angle_acc can be updated using the following formula:

$$\text{unwrap\_angle\_acc} = \text{unwrap\_angle\_acc} * (1-F3) + \text{unwrap\_angle} * F3 \qquad (3);$$

wherein the smoothing parameter F3 can be any suitable value, such as (1/8), (1/16) or (1/32).

Finally, the determination circuit 540 determines whether an effective signal appears in the filter output signal FIR_out according to the unwrap smooth calculation result unwrap_angle_acc. Specifically, the unwrap smooth calculation result unwrap_angle_acc represents the phase characteristic of the filter output signal FIR_out. In this embodiment, if the filter input signal FIR_in only includes the interference signal of the adjacent channel, because the filter 170 is also linear in phase, the filter 170 will not change the phase characteristics of the processed signal, so the phase characteristics of the filter output signal FIR_out will be the same or very similar to the phase characteristics of the filter input signal FIR_in, and at this time, the unwrap smooth calculation result unwrap_angle_acc will have the consistent characteristics. On the other hands, if the filter input signal FIR_in has an effective signal with the interference signal, since the phase of the effective signal is nonlinear, the phase characteristic of the filter output signal FIR_out will change, and the unwrap smooth calculation results unwrap_angle_acc will show different trends or significant changes.

In one embodiment, if the unwrap smooth calculation result unwrap_angle_acc is less than zero, and the unwrap smooth calculation results unwrap_angle_acc is greater than a summation of a previous unwrap smooth calculation result unwrap_angle last and a threshold value TH3, the determination circuit 540 can determine that the effective signal is received at this time, and set an effective signal indicator sig_flag to "1". If the unwrap smooth calculation result unwrap_angle_acc is greater than zero, and the unwrap smooth calculation result unwrap_angle_acc is less than a difference between the previous unwrap smooth calculation result unwrap_angle last and the threshold value TH3, the determination circuit 540 can determine that the effective signal is received at this time, and set an effective signal indicator sig_flag to "1". Besides, the determination circuit 540 may set the effective signal indicator sig_flag to "0".

Figure 6:
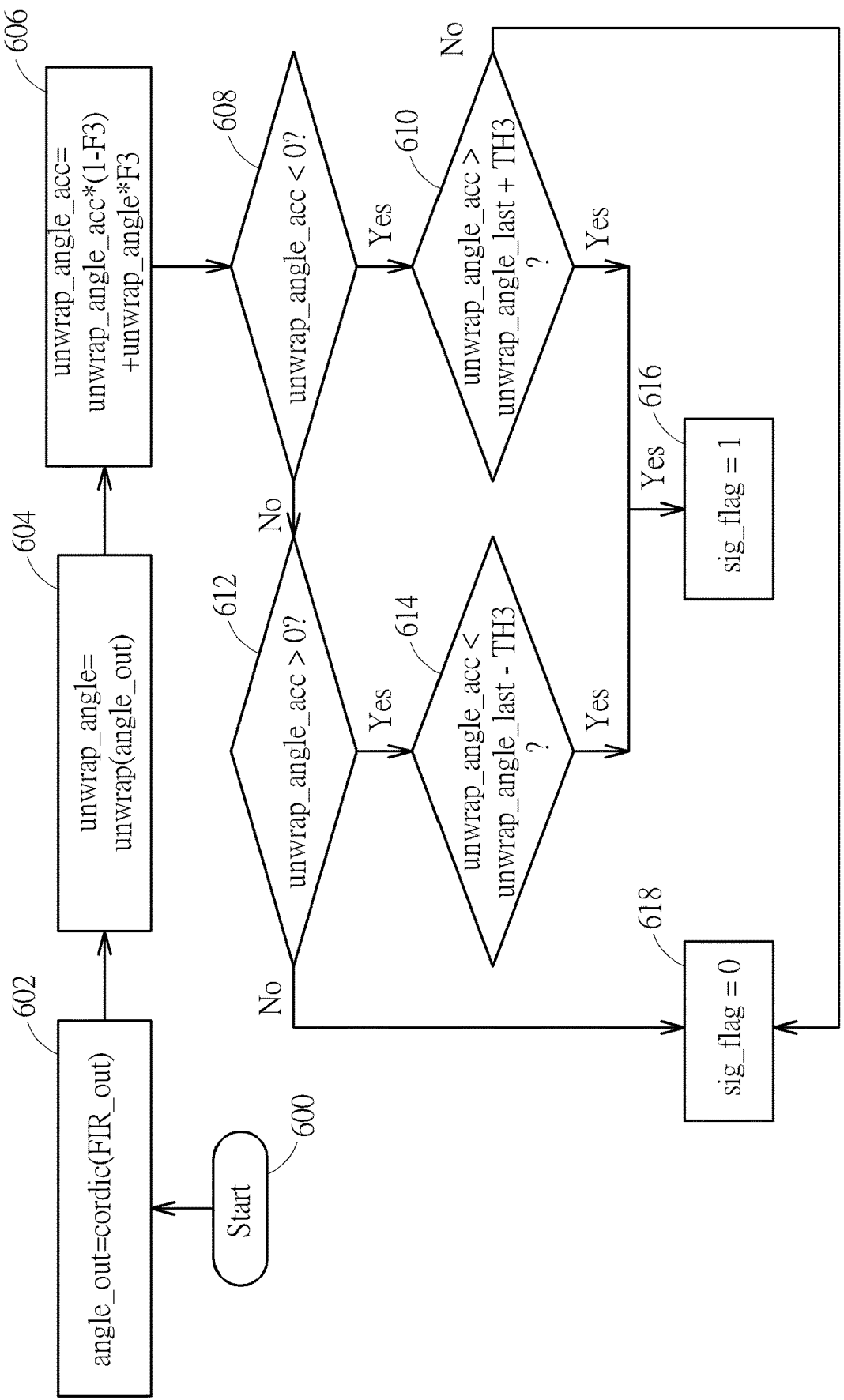
FIG. 6 is a diagram of determining whether the filter output signal comprises an effective signal according to one embodiment of the present invention.

FIG. 6 is a diagram of determining whether the filter output signal FIR_out comprises an effective signal according to one embodiment of the present invention. Referring to FIG. 5 and FIG. 6 together, the flow is described as follows.

Step 600: the flow starts.

Step 602: calculate the phase value angle_out of the filter output signal FIR_out, that is angle_out=cordic(FIR_out).

Step 604: unwrap the phase value angle_out to generate the unwrap result unwrap_angle, that is, unwrap_angle=unwrap(angle_out).

Step 606: Update the unwrap smooth calculation result unwrap_angle_acc according to the unwrap result unwrap_angle and the smoothing parameter F3, which can be calculated by using formula (3).

Step 608: determine if the unwrap smooth calculation result unwrap_angle_acc is less than zero, if yes, the flow enters Step 610; and if not, the flow enters Step 612.

Step 610: determine if the unwrap smooth calculation result unwrap_angle_acc is greater than a summation of the previous unwrap smooth calculation result unwrap_angle last and the threshold value TH3, if yes, the flow enters Step 616; and if not, the flow enters Step 618.

Step 612, determine if the unwrap smooth calculation result unwrap_angle_acc is greater than zero, if yes, the flow enters Step 614; and if not, the flow enters Step 618.

Step 614: determine if the unwrap smooth calculation result unwrap_angle_acc is less than a difference between the previous unwrap smooth calculation result unwrap_angle last and the threshold value TH3, if yes, the flow enters Step 616; and if not, the flow enters Step 618.

Step 616: set the effective signal indicator to "1" to indicate that the filter output signal FIR_out comprises the effective signal.

Step 618: set the effective signal indicator to "0" to indicate that the filter output signal FIR_out does not comprise the effective signal.

Figure 7:
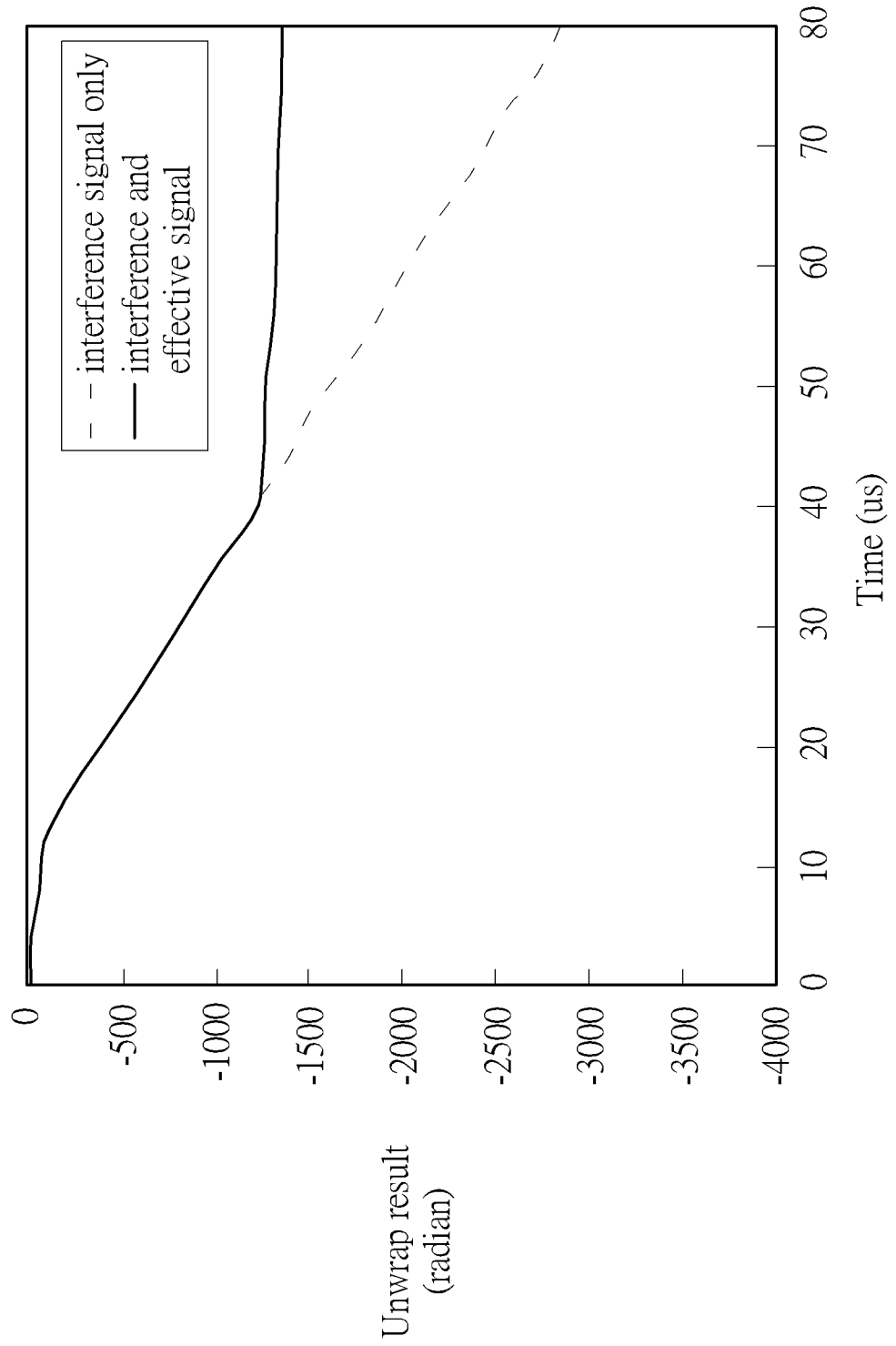
FIG. 7 is a diagram showing that an effective signal is received after receiving an interference signal according to one embodiment of the present invention.

In order to better understand the determination mechanism of the effective signal detection circuit 500, referring to FIG. 7, it is a diagram showing that an effective signal is received after receiving an interference signal according to one embodiment of the present invention, wherein FIG. 7 is a simulation diagram of the effective signal with a center frequency of 8 MHz and an energy of (−82) dB, and an interference signal with a frequency of (−2) MHz and an energy of (−52) dB. As shown in FIG. 7, when the time is 10 us, the interference signal appears, and the unwrap result unwrap_angle or the unwrap smooth calculation result unwrap_angle_acc will maintain linear. If the effective signal appears when the time is 40 us, the unwrap result unwrap_angle or the unwrap smooth calculation result unwrap_angle_acc will change significantly, such as the turning point shown in FIG. 7. Therefore, the determination circuit 540 can determine whether the filter output signal FIR_out comprises the effective signal according to the trend of the unwrap result unwrap_angle or the unwrap smooth calculation result unwrap_angle_acc, and can also accurately determine the time that the effective signal appears.

Figure 8:
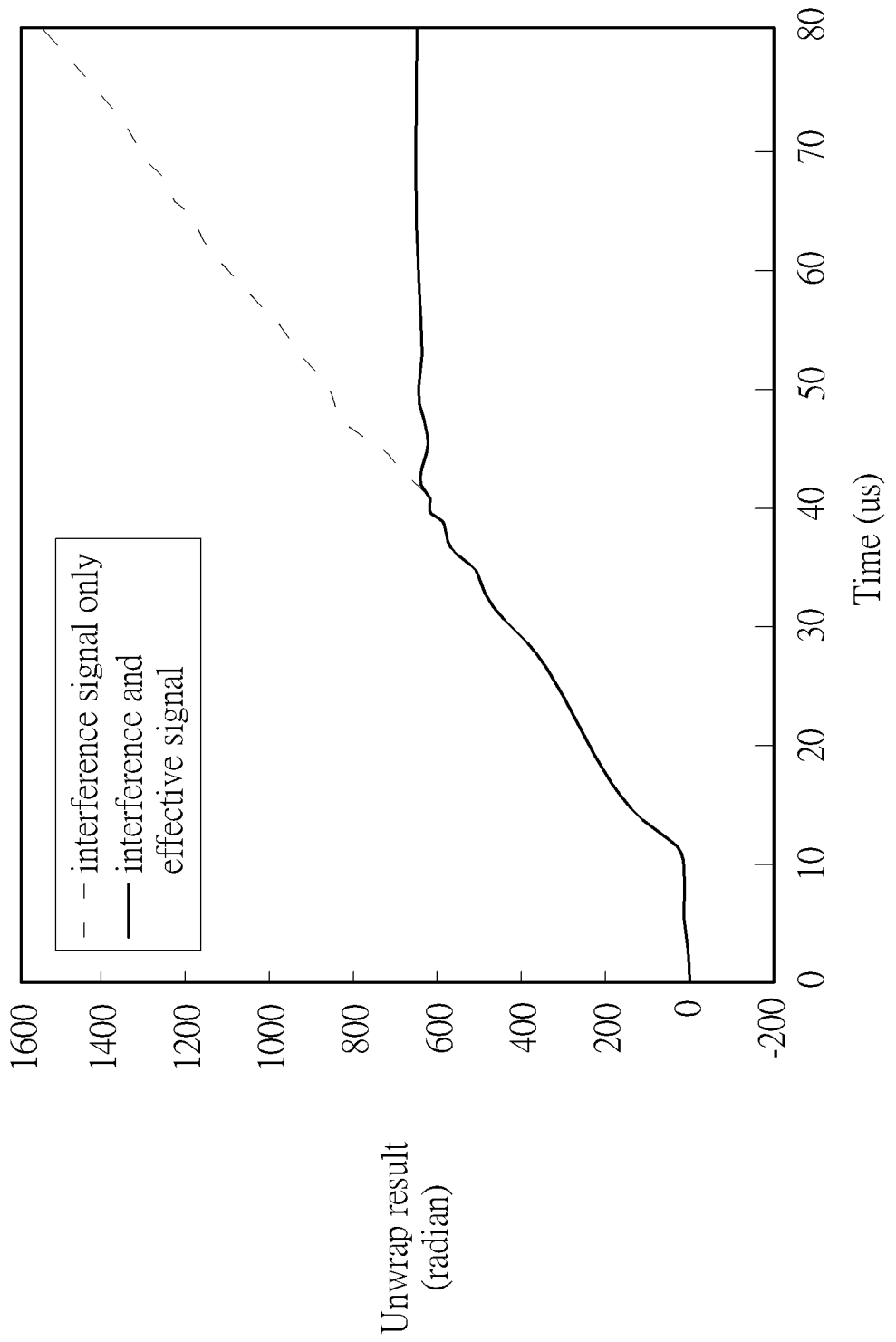
FIG. 8 is a diagram showing that the effective signal is received after receiving an interference signal according to another embodiment of the present invention.

Similarly, referring to FIG. 8, it is a diagram showing that an effective signal is received after receiving an interference signal according to another embodiment of the present invention, wherein FIG. 8 is a simulation diagram of the effective signal with a center frequency of 3 MHz and an energy of (−82) dB, and an interference signal with a frequency of 13 MHz and an energy of (−52) dB. As shown in FIG. 8, when the time is 10 us, the interference signal appears, and the unwrap result unwrap_angle or the unwrap smooth calculation result unwrap_angle_acc will maintain linear. If the effective signal appears when the time is 40 us, the unwrap result unwrap_angle or the unwrap smooth calculation result unwrap_angle_acc will change significantly, such as the turning point shown in FIG. 8. Therefore, the determination circuit 540 can determine whether the filter output signal FIR_out comprises the effective signal according to the trend of the unwrap result unwrap_angle or the unwrap smooth calculation result unwrap_angle_acc, and can also accurately determine the time that the effective signal appears.

It should be noted that the calculation details shown in FIG. 5 and FIG. 6 are merely illustrative, rather than a limitation of the present invention. As long as the effective signal detection circuit 500 can determine whether the effective signal appears by detecting whether the phase characteristic of the filter output signal FIR_out changes, the relevant calculation details can be appropriately changed, such as adding some parameters in the calculation process. These alternative designs should belong to the scope of the present invention.

In another embodiment, the smooth calculation circuit 530 can be removed from the effective signal detection circuit 500, that is, the determination circuit 540 can determine whether the filter output signal FIR_out comprises the effective signal according to the unwrap result unwrap_angle. This alternative design should belong to the scope of the present invention.

In the operation of the synchronization processing circuit 190, it is mainly to find the preamble field of the effective signal and start processing. Since the synchronization operation requires a certain matching time, when to start the synchronization operation is an important issue. In this embodiment, if the interference signal indicator intf_flag is first changed from "0" to "1", and then the effective signal indicator sig_flag is changed to "1", it can be determined that the receiver 100 is currently receiving the effective signal, so the synchronization processing circuit 190 can start to perform the synchronization operation at this time (that is, start to find the preamble field and start processing).

In addition, the synchronization processing circuit 190 can also change the wrong synchronization operation in real time. For example, if the interference signal indicator intf_flag is first changed from "0" to "1", then the synchronization processing circuit 190 starts the synchronization operation due to the triggering of other mechanisms, and then the effective signal indicator sig_flag changes to "1", the synchronization processing circuit 190 can determine that the synchronization operation triggered by other mechanisms is wrong, so the previous synchronization operation can be interrupted immediately and a new synchronization operation can be restarted.

Briefly summarized, in the receiver of the present invention, by determining whether the currently received signal has an interference signal, and then determining whether the effective signal exists according to whether the phase characteristic of the filter output signal has changed, it can accurately detect the time when the effective signal appears in the presence of the interfering signal, so as to facilitate the operation of the subsequent synchronization processing circuit Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A receiver, comprising:
a filter, configured to filter a filter input signal to generate a filter output signal;
a signal detection circuit, coupled to the filter, configured to determine whether the filter input signal or the filter output signal comprises an interference signal according to the filter input signal and the filter output signal, to generate an interference signal indicator; wherein when the interference signal indicator indicates that the filter input signal or the filter output signal comprises the interference signal, the signal detection circuit further determines whether the filter output signal comprises an effective signal to generate an effective signal indicator; and
a synchronization processing circuit, coupled to the filter and the signal detection circuit, configured to process the filter output signal according to the interference signal indicator and the effective signal indicator.

2. The receiver of claim 1, wherein when the interference signal indicator indicates that the filter input signal or the filter output signal comprises the interference signal, the signal detection circuit determines whether the filter output signal comprises the effective signal to generate the effective signal indicator according to phase characteristic of the filter output signal.

3. The receiver of claim 2, wherein when the interference signal indicator indicates that the filter input signal or the filter output signal comprises the interference signal, and the signal detection circuit determines that the filter output signal has linear phase characteristic, the signal detection circuit determines that the filter output signal does not comprise the effective signal; and if the signal detection circuit determines that the linear phase characteristic of the filter output signal changes, the signal detection circuit determines that the filter output signal comprises the effective signal.

4. The receiver of claim 2, wherein the signal detection circuit comprises an effective signal detection circuit, and the effective signal detection circuit comprises:
a phase calculation circuit, configured to generate a phase value of the filter output signal;
an unwrap circuit, coupled to the phase calculation circuit, configured to unwrap the phase value outputted by the phase calculation circuit to generate an unwrap result; and
a determination circuit, coupled to the unwrap circuit, configured to determine whether the linear phase characteristic of the filter output signal changes according to the unwrap result, so as to determine whether the filter output signal comprises the effective signal.

5. The receiver of claim 4, further comprising:
a smooth calculation circuit, coupled between the unwrap circuit and the determination circuit, configured to update an unwrap smooth calculation result according to the unwrap result and a smoothing parameter;
wherein the determination circuit determines whether the linear phase characteristic of the filter output signal changes according to the unwrap smooth calculation result, so as to determine whether the filter output signal comprises the effective signal.

6. The receiver of claim 4, wherein when the interference signal indicator indicates that the filter input signal or the filter output signal comprises the interference signal, the determination circuit determines whether the unwrap result maintains a linear trend; if the unwrap result maintains the linear trend, the determination circuit determines that the phase characteristic of the filter output signal does not change, and the filter output signal does not comprise the effective signal; and if the unwrap result does not maintain the linear trend, the determination circuit determines that the phase characteristic of the filter output signal changes, and the filter output signal comprises the effective signal.

7. The receiver of claim 1, wherein if the interference signal indicator indicates that the filter input signal or the filter output signal comprises the interference signal, then the synchronization processing circuit starts a synchronization operation to process the filter output signal due to a triggering of another mechanism, and then the effective signal indicator starts to indicate that the filter output signal comprises the effective signal, the synchronization processing circuit determines that the synchronization operation is wrong, and the synchronization processing circuit starts to perform a new synchronization operation for the filter output signal.

8. The receiver of claim 1, wherein the signal detection circuit determines whether the filter input signal and the filter output signal comprises the interference signal of an adjacent channel according to the filter input signal and the filter output signal, to generate the interference signal indicator.

9. The receiver of claim 8, wherein the filter is a finite impulse response (FIR) filter, and the receiver supports Zigbee specifications.

10. A signal processing method, comprising:
   filtering a filter input signal to generate a filter output signal;
   determining whether the filter input signal or the filter output signal comprises an interference signal according to the filter input signal and the filter output signal, to generate an interference signal indicator;
   when the interference signal indicator indicates that the filter input signal or the filter output signal comprises the interference signal, determining whether the filter output signal comprises an effective signal to generate an effective signal indicator; and
   processing the filter output signal according to the interference signal indicator and the effective signal indicator.

11. The signal processing method of claim 10, wherein the step of determining whether the filter output signal comprises the effective signal to generate the effective signal indicator comprises:
   when the interference signal indicator indicates that the filter input signal or the filter output signal comprises the interference signal, determining whether the filter output signal comprises the effective signal to generate the effective signal indicator according to phase characteristic of the filter output signal.

12. The signal processing method of claim 11, wherein the step of determining whether the filter output signal comprises the effective signal to generate the effective signal indicator according to the phase characteristic of the filter output signal comprises:
   when the interference signal indicator indicates that the filter input signal or the filter output signal comprises the interference signal, and it is determined that the filter output signal has linear phase characteristic, determining that the filter output signal does not comprise the effective signal; and
   when the linear phase characteristic of the filter output signal changes, determining that the filter output signal comprises the effective signal.

13. The signal processing method of claim 11, wherein the step of determining whether the filter output signal comprises the effective signal to generate the effective signal indicator according to the phase characteristic of the filter output signal comprises:
   generating a phase value of the filter output signal;
   unwrapping the phase value to generate an unwrap result; and
   determining whether the linear phase characteristic of the filter output signal changes according to the unwrap result, so as to determine whether the filter output signal comprises the effective signal.

14. The signal processing method of claim 13, wherein the step of determining whether the filter output signal comprises the effective signal to generate the effective signal indicator according to the phase characteristic of the filter output signal further comprises:
   updating an unwrap smooth calculation result according to the unwrap result and a smoothing parameter; and
   determining whether the linear phase characteristic of the filter output signal changes according to the unwrap smooth calculation result, so as to determine whether the filter output signal comprises the effective signal.

15. The signal processing method of claim 13, wherein the step of determining whether the linear phase characteristic of the filter output signal changes according to the unwrap result, so as to determine whether the filter output signal comprises the effective signal comprises:
   when the interference signal indicator indicates that the filter input signal or the filter output signal comprises the interference signal, determining whether the unwrap result maintains a linear trend;
   if the unwrap result maintains the linear trend, determining that the phase characteristic of the filter output signal does not change, and the filter output signal does not comprise the effective signal; and
   if the unwrap result does not maintain the linear trend, determining that the phase characteristic of the filter output signal changes, and the filter output signal comprises the effective signal.

16. The signal processing method of claim 10, wherein the step of processing the filter output signal according to the interference signal indicator and the effective signal indicator comprises:
   if the interference signal indicator indicates that the filter input signal or the filter output signal comprises the interference signal, then a synchronization operation is started to process the filter output signal due to a triggering of another mechanism, and then the effective signal indicator starts to indicate that the filter output signal comprises the effective signal, determining that the synchronization operation is wrong, and starting to perform a new synchronization operation for the filter output signal.

17. The signal processing method of claim 10, wherein the step of determining whether the filter input signal or the filter output signal comprises the interference signal according to the filter input signal and the filter output signal, to generate the interference signal indicator comprises:
   determining whether the filter input signal or the filter output signal comprises the interference signal of an adjacent channel according to the filter input signal and the filter output signal, to generate the interference signal indicator.

* * * * *